(12) United States Patent
Kumar

(10) Patent No.: US 7,949,738 B2
(45) Date of Patent: May 24, 2011

(54) GRAPHICAL INTERFACE FOR GENERATING AND PREVIEWING A RULE

(75) Inventor: Janaki Kumar, Palo Alto, CA (US)

(73) Assignee: Sap Aktiengesellschaft, Walldorf (DE)

( * ) Notice: Subject to any disclaimer, the term of this patent is extended or adjusted under 35 U.S.C. 154(b) by 2233 days.

(21) Appl. No.: 10/777,420

(22) Filed: Feb. 12, 2004

(65) Prior Publication Data

US 2005/0183025 A1 Aug. 18, 2005

(51) Int. Cl.
*G06F 15/173* (2006.01)

(52) U.S. Cl. .................. 709/223; 709/224; 715/764

(58) Field of Classification Search ............... 709/223, 709/224; 715/764
See application file for complete search history.

(56) References Cited

U.S. PATENT DOCUMENTS

| | | | | |
|---|---|---|---|---|
| 4,891,766 | A * | 1/1990 | Derr et al. | 706/60 |
| 5,555,346 | A * | 9/1996 | Gross et al. | 706/45 |
| 6,249,807 | B1 | 6/2001 | Shaw et al. | |
| 6,282,565 | B1 | 8/2001 | Shaw et al. | |
| 7,237,008 | B1 * | 6/2007 | Tarbotton et al. | 709/206 |
| 7,257,603 | B2 | 8/2007 | Murman et al. | |
| 7,653,879 | B1 * | 1/2010 | Sareen et al. | 715/752 |
| 2004/0064734 | A1 * | 4/2004 | Ehrlich | 713/201 |
| 2004/0088359 | A1 * | 5/2004 | Simpson | 709/206 |
| 2005/0097174 | A1 * | 5/2005 | Daniell | 709/206 |
| 2005/0223074 | A1 * | 10/2005 | Morris | 709/207 |
| 2008/0016019 | A1 | 1/2008 | Loftus et al. | |
| 2009/0113331 | A1 * | 4/2009 | Smith et al. | 715/769 |
| 2009/0235196 | A1 * | 9/2009 | Macbeth et al. | 715/780 |

OTHER PUBLICATIONS

"CRM Systems Section" *CRMBuyer Magazine*, obtained at http://www.crmbuyer.com/perl/story/20690.html, printed from the Internet on Nov. 17, 2003.
Starmanns, "Rule-Based Personalization in mySAP CRM E-Commerce", *SAP AG*, undated, 78 pages, 2003.
University of Wyoming Division of Technology. "Ask it: How to Create an Exception Rule in Microsoft Outlook." (believed to have been published on or before Nov. 3, 2003) [Retrieved on Aug. 10, 2010] Retrieved from the Internet <URL: http://www.uwyo.edu/askit/displaydoc.asp?askitocid=230&parentid=1>.

* cited by examiner

*Primary Examiner* — Mohamed Wasel
(74) *Attorney, Agent, or Firm* — Fish & Richardson P.C.

(57) ABSTRACT

A computer-readable medium containing therein instructions that, when executed, generate on a display device a graphical user interface (GUI) for creating or revising a rule that contains a condition and an action to be taken when the condition is satisfied. The GUI includes a rule-editing area along with first and second user-selectable elements. The rule-editing area is configured to accept user input to create or revise the condition of the rule upon user selection of the first element. The rule-editing area is also configured to accept user input to create or revise the action of the rule upon user selection of the second element. The GUI further includes a rule-preview area that is configured to provide a display of a user-understandable representation of both the condition and the action.

13 Claims, 4 Drawing Sheets

US 7,949,738 B2

GRAPHICAL INTERFACE FOR GENERATING AND PREVIEWING A RULE

TECHNICAL FIELD

This invention relates to the design of text-processing rules in computing systems.

BACKGROUND

Text-processing systems, such as search systems or email response management systems, may need to process an abundance of textual information. For example, an email response management system may need to process as many as 400,000 incoming email messages each day. These incoming email messages may relate to any number of different business scenarios or processes. For example, certain customers may submit service order requests to their service providers via email. Other customers may submit complaints or assistance requests to certain providers via email.

To effectively handle a high volume of textual information, text-processing systems must be able to analyze the information in an efficient and intelligent fashion. Many of these systems include rule-based engines that use rules to analyze textual information. Each rule typically contains a set of conditions and actions. The rule-based engines trigger certain actions when corresponding conditions are satisfied. For example, an email response management system may route an individual email to a particular person if the email contains certain keywords.

Typically, a rule designer will define and modify rules before they are utilized by a rule-based engine in a run-time system. Prior applications have provided the rule designer with various ways of defining and editing these rules. For example, certain applications allow the designer to define the rules using a long sentence or block structure. In these applications, the designer will typically enter all of the conditions and actions for the rule in a single sentence or in a series of phrases.

Other applications may utilize a graphical user interface (GUI) to present the conditions and actions of a rule side by side. In these applications, the rule designer is able to see a condition and action of the rule at the same time, and is then able to edit either the condition or action as necessary. These applications may also provide a preview area below the condition and action areas to provide the designer with a preview of the rule as it is edited.

There are other existing applications that make use of selectable elements, such as graphical tabs, in the GUI. In these applications, a user is able to view and edit different portions of a rule in a sequential fashion. For example, the user may first select a "condition" graphical tab to view and edit the conditions for the rule, and may later select an "action" graphical tab to view and edit the actions for the rule. In these applications, however, the designer is not able to view the rule conditions and actions at the same time.

SUMMARY

Various embodiments of the invention are provided herein. One embodiment of the invention provides a computer-readable medium containing therein instructions that, when executed, generate on a display device a graphical user interface (GUI) for creating or revising a rule that contains a condition and an action to be taken when the condition is satisfied. The GUI includes a rule-editing area along with first and second user-selectable elements. The rule-editing area is configured to accept user input to create or revise the condition of the rule upon user selection of the first element. The rule-editing area is also configured to accept user input to create or revise the action of the rule upon user selection of the second element. The GUI further includes a rule-preview area that is configured to provide a display of a user-understandable representation of both the condition and the action.

Various embodiments of the invention may have certain benefits and advantages. For example, the use of a rule preview area allows a rule designer to see a preview of an entire rule as specific portions of the rule are modified. This rule may later be used at run time to process textual information, such as information contained within an incoming email message.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
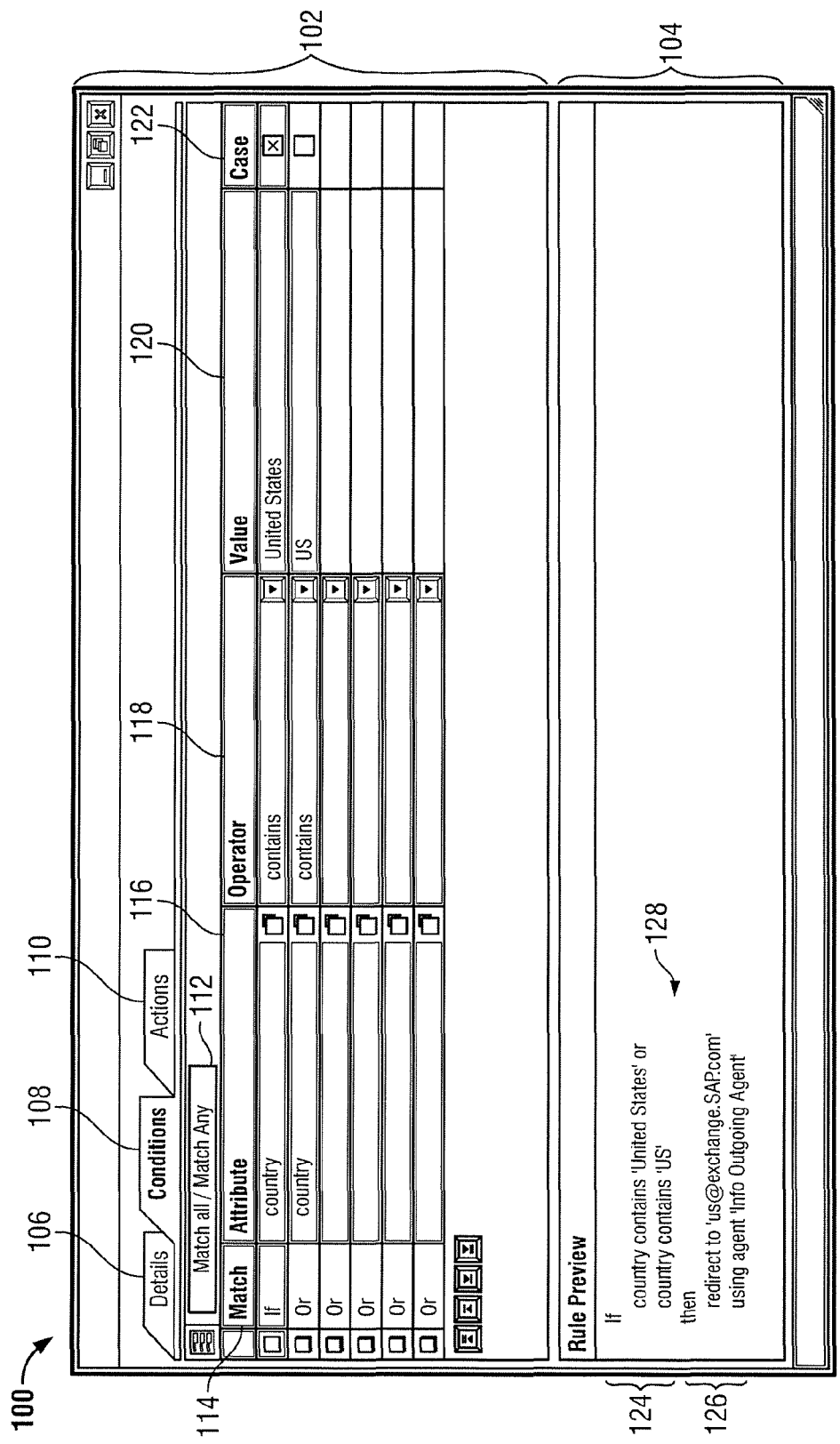
FIG. 1A is a screen display of a graphical user interface (GUI) that may be used to define and preview a text-processing rule, according to one embodiment.

FIG. 1A is a screen display of a graphical user interface (GUI) 100 that may be used to preview a text-processing rule, according to one embodiment. In this embodiment, the GUI 100 may be used by designers to create or revise rules that can later be used to process textual information, such as information contained within email messages or within textual search requests. These rules typically include a set of conditions and a set of actions that are triggered when certain conditions are satisfied. The GUI 100 includes a first selectable element 108 and a second selectable element 110. A user, such as a rule designer, may select the first selectable element 108 to create or revise a first portion of the text-processing rule in a rule-editing area 102. The user may alternatively select the second selectable element 110 to create or revise a second portion of the text-processing rule in the rule-editing area 102. The GUI 100 also includes a rule-preview area 104 that is configured to provide the user with a user-understandable representation of both the first and second portions 124 and 126 of the text-processing rule 128. As shown in FIG. 1A, the user has selected the selectable element 108 and is therefore able to edit the first portion of the text-processing rule in the editing area 102.

The GUI 100 shown in FIG. 1A includes various screen components. A user may select any of selectable elements 106, 108, or 110. In the embodiment shown in FIG. 1A, the selectable element 106 is adjacent to the selectable element 108, which is then adjacent to the selectable element 110. The selectable elements 106, 108, and 110 may be various forms of elements, such as button or text (e.g., hypertext) elements.

In the example shown in FIG. 1A, the selectable elements 106, 108, and 110 are graphical tabs. The selectable element 106 is associated with the definition details of the rule 128. For example, the definition details may include a name, a creation date, modification dates, etc. of the rule 128. If the user selects the selectable element 106, the definition details would then be displayed to the user (which is not shown in FIG. 1A). The selectable element 108 is associated with the portion 124 of the rule 128. If the user selects the selectable element 108, the editing area 102 will provide a textual display of an editable version of the portion 124 of the rule 128, as shown in FIG. 1A. The portion 124 includes text that pertains to one or more conditions of the rule 128. Once the portion 124 of the rule 128 is displayed in the editing area 102, the user may edit the portion 124.

The editing area 102 of the GUI 100 contains various text-entry fields and menus that allow the user to edit the portion 124 of the rule 128. These fields and menus are shown in columns 116, 118, and 120. The portion 124 of the rule 128 displayed in FIG. 1A contains two distinct conditions. The user may select an attribute name for each condition using the column 116. The user may click on a button to view of list of options for the attribute name, and may then select one of the attribute names from the list. In one embodiment, the list of options is displayed in a pop-up window. In one embodiment, the GUI 100 accesses an attribute-name repository to determine which attribute names will be included in the list of options. As shown in FIG. 1A, the user has selected the attribute name "country" for each of the two defined conditions. The user may also select an operator for each condition using the column 118. The user may utilize a pull-down menu to view a list of options for the operator, and may then select one of the operators from the list. In one embodiment, the GUI 100 accesses an operator repository to determine which operators will be included in the list of options. As shown in FIG. 1A, the user has selected the operator "contains" for each of the two defined conditions. In one embodiment, the user may have the option of selecting an operator "does not contain" in the column 118 for the first and/or second defined conditions.

The user may also enter the attribute value for each condition using the text-entry fields that are included within the column 120. These attribute values relate to the attribute names that are shown in the column 116. The user may simply enter text into the text-entry fields within the column 120 to specify the corresponding attribute values. As shown in FIG. 1A, the user has entered the attribute value "United States" in the first defined condition, and has entered the attribute value "US" in the second defined condition. The user may specify the case sensitivity of the attribute values by using the selectors in the column 122. In the example shown in FIG. 1A, the user has specified in the column 122 that the attribute value "United States" is case sensitive, but that the attribute value "US" is not case sensitive.

The user may specify the condition matching characteristics by specifying the logical operators in the column 114. These logical operators connect the various conditions. The logical operators may be set to "And," "Or," or "Not." In the example shown in FIG. 1A, the portion 124 of the rule 128 contains two distinct conditions. The user has specified in the column 114 that these two conditions are connected by a logical "Or" operator. The user may change the logical operators by directly changing the designations within the column 114. Alternatively, the user may select a button 112 to change all of the designations for the column 114. In one embodiment, the button 112 is a toggle button. If the user selects the button 112 a first time, all of the logical operators in the column 114 will change to "And" (i.e., match all). If the user selects the button 112 a second time, all of the logical operators in the column 114 will change to "Or" (i.e., match any).

Figure 2:
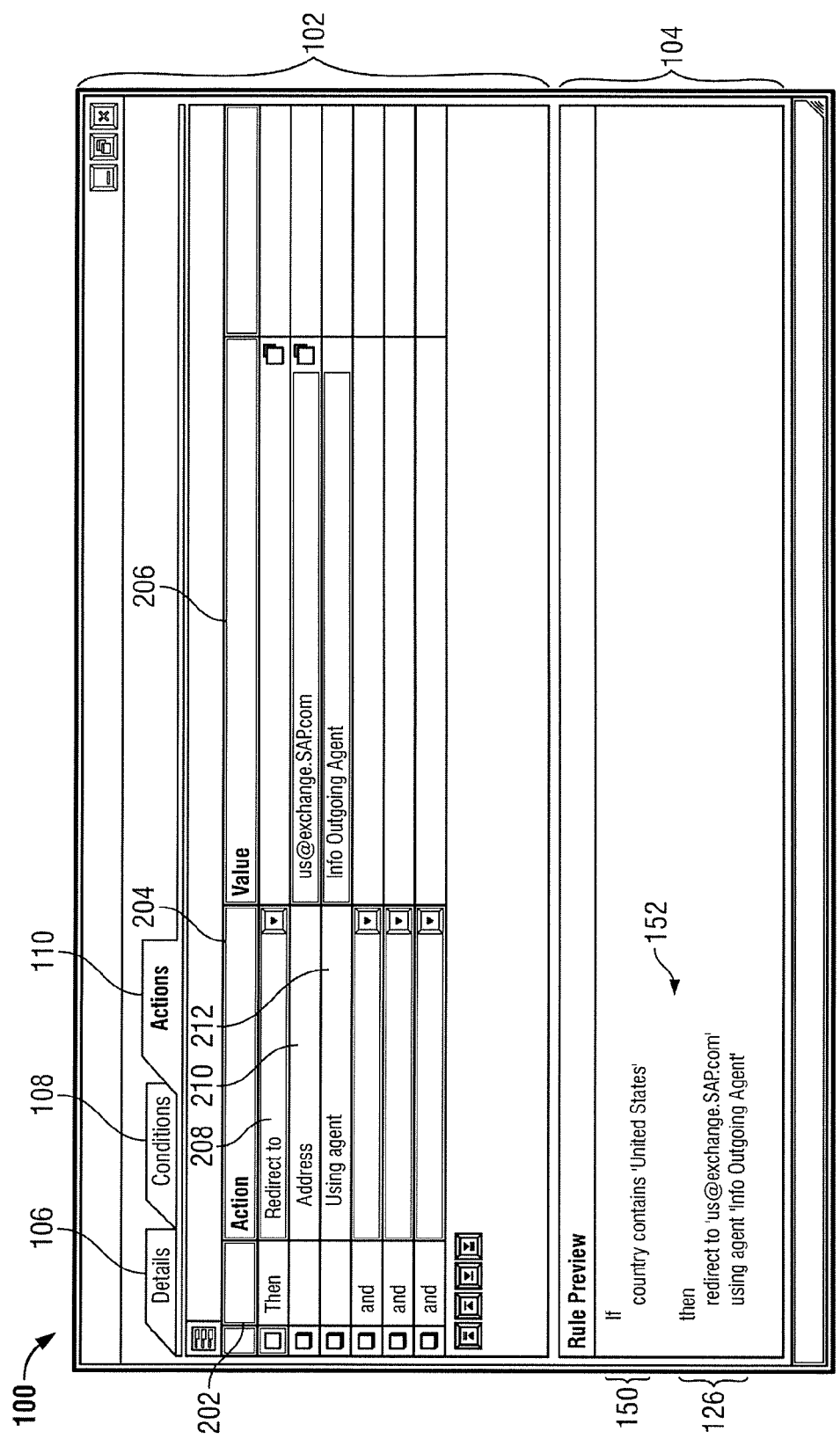
FIG. 2 is a screen display of the GUI shown in FIG. 1B, wherein the GUI allows the user to edit a rule action.

The selectable element 110 is associated with the portion 126 of the rule 128. If the user selects the selectable element 110, the editing area 102 will provide a textual display of an editable version of the portion 126 of the rule 128. In FIG. 2, which is described in more detail below, the editing area 102 includes an example of an editable version of the portion 126 of the rule 128.

The GUI 100 also includes the preview area 104 that provides a textual display of the rule 128 in a read-only format. The entire rule 128, including the portions 124 and 126, are displayed. Because the display is in a read-only format, the user cannot edit the portions 124 or 126 directly within the preview area 104. However, the user is able to see a holistic and dynamic view of the rule 128 as it is currently defined. If the user, for example, modifies the portion 124 of the rule 128 in the editing area 102 shown in FIG. 1A, the preview area 104 will automatically display the updated portion 124 in a read-only format. In addition, the user can also see the portion 126 of the rule 128, even though the user has selected the selectable element 108 to view and edit the portion 124 of the rule 128 in the editing area 102. In one embodiment, the preview area 104 may be capable of providing a display of the rule 128 in a read-write format. In this embodiment, the user may be able to both view and change the portions 124 and/or 126 of the rule 128 directly within the preview area 104.

The rule 128 shown in FIG. 1A may be used during run time in a rule-based system to process textual information. For example, the rule 128 could be used to analyze the contents of an incoming email message. The portion 124 of the rule 128 contains two conditions. Either one of these conditions may be satisfied because they are connected by a logical "or" operator. The first condition tests whether the incoming email message has a field, or attribute, named "country" that contains a value of "United States". For example, the incoming email message may have a designated field, or attribute, called "country" that designates the origin of the message. If this field or attribute contains the value "United States," then the first listed condition will be satisfied. Alternatively, if this field or attribute contains a value of "US", then the second listed condition will be satisfied. If either the first or second condition is satisfied, then the action specified in the portion 126 of the rule 128 will be triggered. This action specifies that the email message is to be redirected to the address of "us@exchange.SAP.com" using a software agent called "Info Outgoing Agent". This software agent may be responsible for re-routing incoming email messages to the appropriate personnel as they arrive from customers. For example, certain personnel may be responsible for handling email messages arriving from customers located within the United States. The rule 128 will assist in routing these email messages appropriately.

Figure 1B:
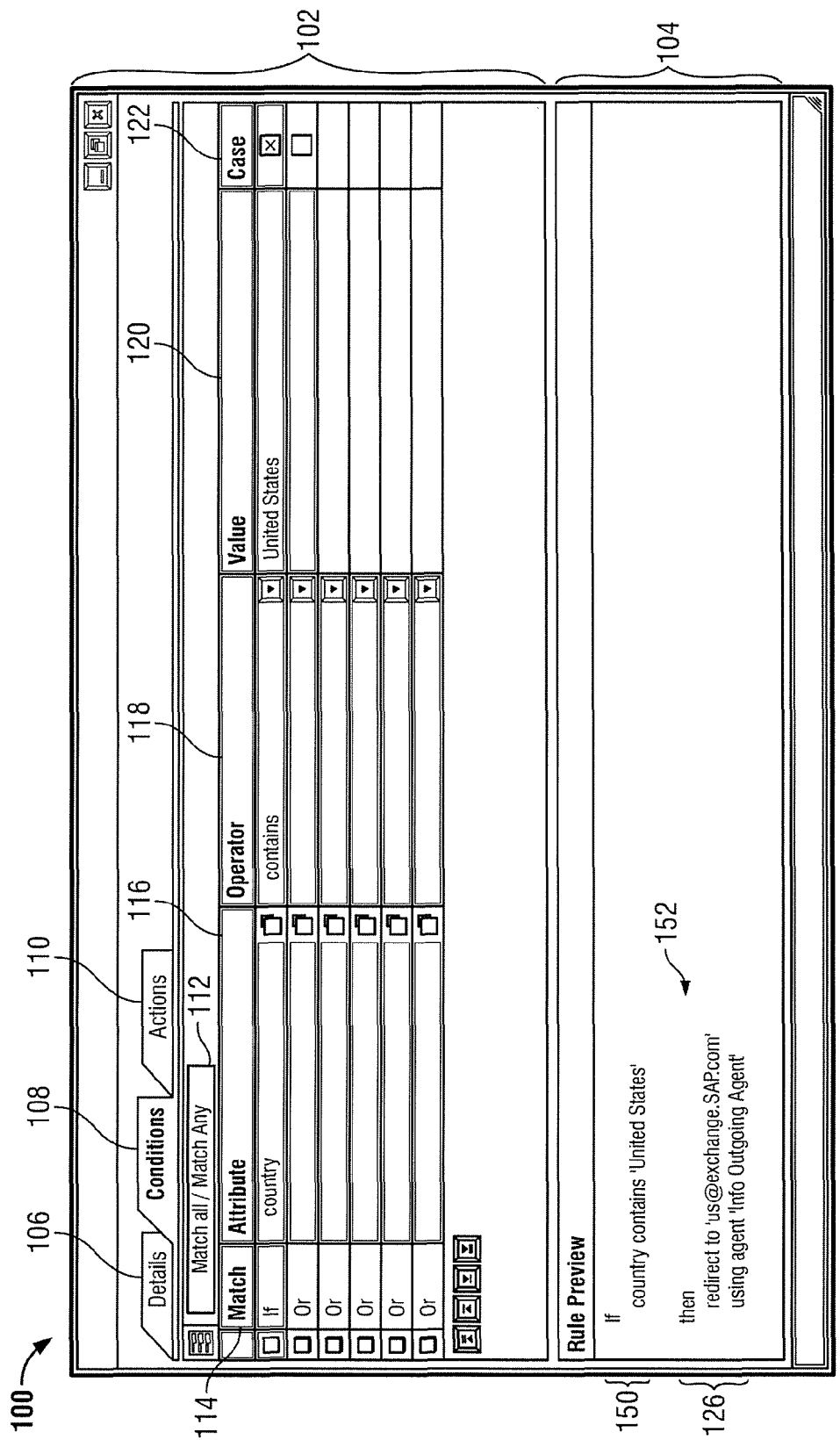
FIG. 1B is a screen display of the GUI shown in FIG. 1A, wherein a user has deleted a rule condition.

FIG. 1B is a screen display of the GUI 100 shown in FIG. 1A, wherein a user has deleted a rule condition in the editing area 102. As shown previously in FIG. 1A, the user had initially added two rule conditions in the editing area 102 that were separated by a logical "Or" operator. In FIG. 11B, the user has deleted the condition "country contains 'US'", such that the only remaining condition shown in the editing area 102 is "country contains 'United States'". To delete the condition, the user may use a delete menu option, or may simply remove the attribute name, operator, and attribute value entries for the condition.

After the user has deleted the condition in the editing area 102, the user may view a user-understandable representation of a revised rule 152 as shown in the preview area 104. As shown in FIG. 1B, the rule 152 includes a modified portion 150 and the portion 126, which was previously shown in FIG. 1A. The modified portion 150 of the rule 152 includes only the updated set of conditions as specified by the user in the editing area 102. As such, the preview area 104 provides the user with a holistic and current view of the entire rule 152. The user can see both the modified portion 150 and the portion 126 of the rule 152 in the preview area 104, even though the user has selected the selectable element 108 in FIG. 11B and can therefore only edit rule conditions in the editing area 102. The user can also see the most current view of the modified portion 150 in the preview area 104 as the user makes modifications in the editing area 102.

FIG. 2 is a screen display of the GUI 100 shown in FIG. 11B, wherein the GUI 100 allows a user to edit a rule action. The user is able to select the selectable element 110 in the GUI 100 to edit the portion 126 of the rule 152 in the editing area 102. As shown in the preview area 104 in FIG. 2, the portion 126 corresponds to a rule action. At run time, this action is triggered when the condition specified in the portion 150 of the rule 152 is satisfied.

The editing area 102 of the GUI 100 contains various text-entry fields and menus that allow the user to edit the portion 126 of the rule 152. These fields and menus are shown in columns 202, 204, and 206. Using the column 202, the user may specify the logical operators (such as "and", "or", and "not") that are used to connect the various rule actions. The portion 126 of the rule 152 only contains a single action, but the user could also add additional actions and then specify the corresponding logical operators in the column 202. The user is able to specify the action names, attributes, and values using the text-entry fields and menus in the columns 204 and 206. As shown in the example in FIG. 2, the user has used a pull-down menu to select an action name 208 of "Redirect to" in the column 204. The action name 208 corresponds to a redirect action. After the user has selected the action name 208, corresponding action attributes 210 and 212 are displayed. The specific attributes that are displayed in the column 204 depend on particular action name that is selected. The attribute 210 ("Address") and the attribute 212 ("Using agent") are specifically associated with the action name 208 ("Redirect to"). The user is able to select the values that correspond to the attributes 210 and 212 in the column 206. In one embodiment, the user may use pop-up menus to select values. In one embodiment, the user may enter values using text-entry fields. As shown in the editing area 102 of the GUI 100, the user has selected a value of "us@exchange.SAP.com" for the attribute 210, and a value of "Info Outgoing Agent" for the attribute 212.

Figure 3:
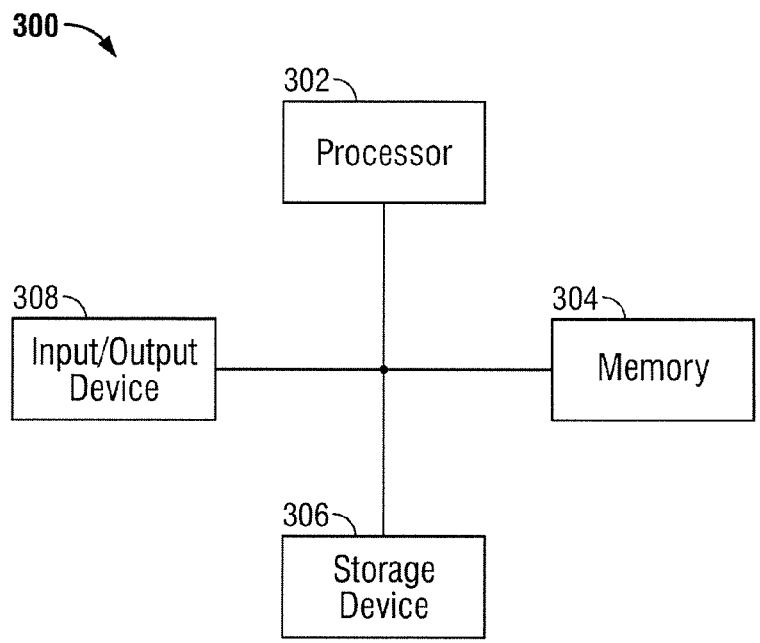
FIG. 3 is a block diagram of a computing system that may be used for displaying the various GUI's shown in FIG. 1A, FIG. 1B, and FIG. 2, according to one embodiment.

FIG. 3 is a block diagram of a computing system 300 that may be used for displaying the various GUI's shown in FIG. 1A, FIG. 1B, and FIG. 2, according to one embodiment. The system 300 includes a processor 302, a memory 304, a storage device 306, and an input/output device 308. Each of the components 302, 304, 306, and 308 are interconnected using a system bus. The processor 302 is capable of processing instructions for execution within the system 300. In one embodiment, the processor 302 is a single-threaded processor. In another embodiment, the processor 302 is a multi-threaded processor. The processor 302 is capable of processing instructions stored in the memory 304 or on the storage device 306 to display graphical information for a GUI on the input/output device 308.

The memory 304 stores information within the system 300. In one embodiment, the memory 304 is a computer-readable medium. In one embodiment, the memory 304 is a volatile memory unit. In another embodiment, the memory 304 is a non-volatile memory unit.

The storage device 306 is capable of providing mass storage for the system 300. In one embodiment, the storage device 306 is a computer-readable medium. In various different embodiments, the storage device 306 may be a floppy disk device, a hard disk device, an optical disk device, or a tape device.

The input/output device 308 provides input/output operations for the system 300. In one embodiment, the input/output device 308 includes a keyboard and/or pointing device. In one embodiment, the input/output device 308 includes a display unit for displaying the GUI's shown in FIG. 1A and FIG. 2.

Figure 4:
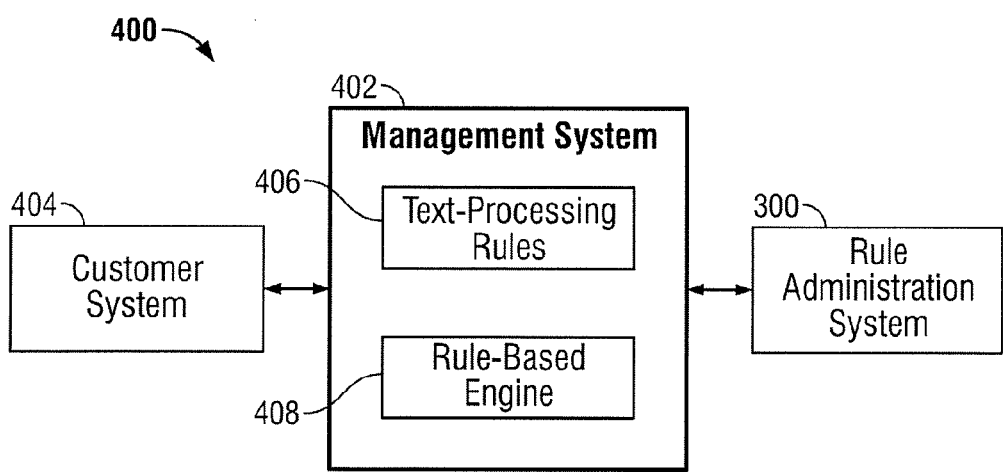
FIG. 4 is a block diagram of a system that may be used to administer and manage text-processing rules, according to one embodiment.

FIG. 4 is a block diagram of a system 400 that may be used to administer and manage text-processing rules, according to one embodiment. In this embodiment, the system 400 includes the computing system 300 that is shown in FIG. 3. As shown, the computing system 300 is a rule administration system that is used to create and modify text-processing rules 406 in a management system 402. The text-processing rules 406 each include a set of conditions and actions. The management system 402 also includes a rule-based engine 408 that processes the text-processing rules 406.

A customer system 404 is also coupled to the management system 402. In one embodiment, the customer system 404 contains a processor, a memory, a storage device, and an input/output device, similar to the computing system 300. During operation, the customer system 404 sends textual information to the management system 402. For example, the customer system 404 may send email or search query information to the management system 402. The management system 402 is then capable of processing the incoming textual information by using the text-processing rules 406 and the rule-based engine 408. The rule-based engine 408 processes the textual information along with the rule actions in the text-processing rules 406 to determine if certain actions are to be triggered. For example, in one embodiment, the rule-based engine 408 may determine that an automatic acknowledgement or response email message is to be sent back to the customer system 404. This acknowledgement or response will be triggered by the rule-based engine 408 as a result of an action of one of the text-processing rules 406. Any number of different actions may also be triggered by the rule-based engine 408.

A number of embodiments of the invention have been described. Nevertheless, it will be understood that various modifications may be made without departing from the spirit and scope of the invention. For example, the text-processing rules may be used to process text contained within search requests, interactive chat messages, and the like. The rules are used to determine if certain conditions are satisfied, based on textual content, and then trigger various actions, such as searching various databases, displaying graphical alerts, sending response emails to a customer, and the like. For example, in various embodiments of the invention, certain functionality may be implemented by hardware, software, or a combination of hardware and software. Various forms of computer-readable media may be utilized to store computer-executable instructions. These computer-readable media may include storage devices, memory devices, propagated signals, and the like. Accordingly, other embodiments are within the scope of the following claims.

What is claimed is:

1. A computer-readable memory containing therein instructions that, when executed, generate on a display device a graphical user interface (GUI) for creating or revising a rule that contains multiple conditions and an action to be taken when the conditions are satisfied, the GUI comprising:

first and second user-selectable elements;

a rule-editing area that is configured to:

(i) display, upon user selection of the first element, a condition input field set for accepting a first user specification of: (a) an attribute name for each of the conditions, (b) an attribute value for each of the conditions, and (c) a choice between an "and" logical operator and an "or" logical operator for logically connecting two or more of the conditions, wherein the condition input field set accepts user selection of the attribute name for each of the conditions from a list of options for the attribute name for each of the conditions and further accepts user input of text for the attribute value for each of the conditions, wherein, after the first user specification, the rule-editing area displays a user-specified attribute name and attribute value for each of the conditions while the condition input field set is displayed, and (ii) display, upon user selection of the second element, an action input field set for accepting a second user specification of: (d) an action name identifying the action, and (e) an action value for the action, wherein the action input field accepts user selection of the action name from a list of options for the action name and further accepts user input of text for the action value, wherein, after the second user specification, the rule-editing area displays a user-specified action name and action value while the action input field set is displayed, and wherein the condition input field set and the action input field set are not displayed concurrently with each other; and a rule preview area configured to provide, after the first and second user specifications, a display of a user-understandable representation of the rule comprising both the conditions and the action, the rule preview area being displayed both while the condition input field set is displayed and while the action input field set is displayed, the user-understandable representation including at least the user-specified attribute name and attribute value for each of the conditions after the first user specification, and including at least the user-specified action name and action value for the action after the second user specification.

2. The computer-readable memory of claim 1, wherein the rule-preview area is configured to provide the display of the user-understandable representation of both the conditions and the action in a read-only format so that a user cannot edit the conditions in the rule-preview area and cannot edit the action in the rule-preview area.

3. The computer-readable memory of claim 1, wherein the rule-editing area is configured to accept user input to create or modify any of the conditions upon user selection of the first element.

4. The computer-readable memory of claim 1, wherein the rule contains at least two actions, and wherein the rule-editing area is configured to accept user input to create or modify any of the actions upon user selection of the second element.

5. The computer-readable memory of claim 1, wherein the rule-editing area contains, for each particular condition of the multiple conditions:

a first menu having a set of user-selectable options for determining the attribute name of the particular condition;

a second menu having a set of user-selectable options for determining the operator of the particular condition; and a text-entry field to accept user input for determining the attribute value of the particular condition.

6. The computer-readable memory of claim 1, wherein the rule-editing area contains:

a menu having a set of user-selectable options for determining the action name of the action; and a text-entry field to accept user input for determining the action value of the action.

7. The computer-readable memory of claim 1, wherein the first user-selectable element is adjacent to the second user-selectable element.

8. The computer-readable memory of claim 1, wherein the first and second user-selectable elements are each either user-selectable buttons or user-selectable text elements.

9. The computer-readable memory of claim 1, wherein the first and second user-selectable elements are each graphical tabs.

10. The computer-readable memory of claim 1, wherein the rule may be used to process textual information.

11. The computer-readable memory of claim 10, wherein the rule may be used to process textual information contained in an email message.

12. A computer-implemented method implemented by a computing system for providing a graphical user interface (GUI) for creating or revising a rule that contains multiple conditions and an action to be taken when the conditions are satisfied, the method comprising:

providing first and second user-selectable elements;

providing a rule-editing area that is configured to:

(i) display, upon user selection of the first element, a condition input field set for accepting a first user specification of: (a) an attribute name for each of the conditions, (b) an attribute value for each of the conditions, and (c) a choice between an "and" logical operator and an "or" logical operator for logically connecting two or more of the conditions, wherein the condition input field set accepts user selection of the attribute name for each of the conditions from a list of options for the attribute name for each of the conditions and further accepts user input of text for the attribute value for each of the conditions, wherein, after the first user specification, the rule-editing area displays a user-specified attribute name and attribute value for each of the conditions while the condition input field set is displayed, and (ii) display, upon user selection of the second element, an action input field set for accepting a second user specification of: (d) an action name identifying the action, and (e) an action value for the action, wherein the action input field accepts user selection of the action name from a list of options for the action name and further accepts user input of text for the action value, wherein, after the second user specification, the rule-editing area displays a user-specified action name and action value while the action input field set is displayed, and wherein the condition input field set and the action input field set are not displayed concurrently with each other; and providing a rule preview area configured to provide, after the first and second user specifications, a display of a user-understandable representation of the rule comprising both the conditions and the action, the rule preview area being displayed both while the condition input field set is displayed and while the action input field set is displayed, the user-understandable representation including at least the user-specified attribute name and attribute value for each of the conditions after the first user specification, and including at least the user-specified action name and action value for the action after the second user specification.

13. A system for providing a graphical user interface (GUI) that may be used to create or revise a rule that contains multiple conditions and an action to be taken when the conditions are satisfied, wherein the system includes:

one or more processors; and computer-readable memory having computer-executable instructions contained therein for performing a method, the method comprising:

providing first and second user-selectable elements;

providing a rule-editing area that is configured to:

(i) display, upon user selection of the first element, a condition input field set for accepting a first user specification of: (a) an attribute name for each of the conditions, (b) an attribute value for each of the conditions, and (c) a choice between an "and" logical operator and an "or" logical operator for logically connecting two or more of the conditions, wherein the condition input field set accepts user selection of the attribute name for each of the conditions from a list of options for the attribute name for each of the conditions and further accepts user input of text for the attribute value for each of the conditions, wherein, after the first user specification, the rule-editing area displays a user-specified attribute name and attribute value for each of the conditions while the condition input field set is displayed, and (ii) display, upon user selection of the second element, an action input field set for accepting a second user specification of: (d) an action name identifying the action, and (e) an action value for the action, wherein the action input field accepts user selection of the action name from a list of options for the action name and further accepts user input of text for the action value, wherein, after the second user specification, the rule-editing area displays a user-specified action name and action value while the action input field set is displayed, and wherein the condition input field set and the action input field set are not displayed concurrently with each other; and providing a rule preview area configured to provide, after the first and second user specifications, a display of a user-understandable representation of the rule comprising both the conditions and the action, the rule preview area being displayed both while the condition input field set is displayed and while the action input field set is displayed, the user-understandable representation including at least the user-specified attribute name and attribute value for each of the conditions after the first user specification, and including at least the user-specified action name and action value for the action after the second user specification.

* * * * *